United States Patent
Kurabayashi

(10) Patent No.: US 11,880,912 B2
(45) Date of Patent: Jan. 23, 2024

(54) IMAGE PROCESSING METHOD, IMAGE PROCESSING SYSTEM, AND PROGRAM FOR COLORIZING LINE-DRAWING IMAGES USING MACHINE LEARNING

(71) Applicant: CYGAMES, INC., Tokyo (JP)

(72) Inventor: Shuichi Kurabayashi, Tokyo (JP)

(73) Assignee: CYGAMES, INC., Tokyo (JP)

( * ) Notice: Subject to any disclaimer, the term of this patent is extended or adjusted under 35 U.S.C. 154(b) by 0 days.

(21) Appl. No.: 17/360,536

(22) Filed: Jun. 28, 2021

(65) Prior Publication Data
US 2021/0327104 A1    Oct. 21, 2021

Related U.S. Application Data

(63) Continuation of application No. PCT/JP2019/050853, filed on Dec. 25, 2019.

(30) Foreign Application Priority Data

Dec. 28, 2018   (JP) ................................. 2018-247800

(51) Int. Cl.
    *G06T 11/00*   (2006.01)
    *G06T 11/40*   (2006.01)
    (Continued)

(52) U.S. Cl.
    CPC ............ *G06T 11/001* (2013.01); *G06N 3/049* (2013.01); *G06T 11/203* (2013.01); *G06T 11/40* (2013.01)

(58) Field of Classification Search
    None
    See application file for complete search history.

(56) References Cited

U.S. PATENT DOCUMENTS 11,010,932 B2    5/2021  Yonetsuji
2006/0281511 A1* 12/2006  Holm ................... A63F 13/655
                                                      463/9

(Continued)

FOREIGN PATENT DOCUMENTS

JP        2018197948 A    12/2018

OTHER PUBLICATIONS

P. Isola et al. "Image-to-Image Translation with Conditional Adversarial Networks" Berkeley AI Research (BAIR) Laboratory, UC Berkeley; arXiv:1611.07004, 2016 (17 pages).

(Continued)

*Primary Examiner* — Tize Ma
(74) *Attorney, Agent, or Firm* — Osha Bergman Watanabe & Burton LLP

(57) ABSTRACT

Provided is an image processing method wherein a computer: generates an estimation model for estimating the colorized image from the line-drawing image for each element through machine learning using the learning data of that element; identifies the element corresponding to the subject line-drawing image; generates the colorized image that is to be paired with the subject line-drawing image, on the basis of the estimation model corresponding to the identified element and the subject line-drawing image; generates a colorization layer of an image file including a line-drawing layer and the colorization layer by using the subject colorized image; extracts the modified colorization layer and the corresponding line-drawing layer as the image pair for learning; and stores a pair of the line-drawing image of the extracted line-drawing layer and the colorized image of the extracted colorization layer, as the learning data, in association with the element corresponding to the estimation model.

11 Claims, 9 Drawing Sheets

(51) Int. Cl.
*G06T 11/20* (2006.01)
*G06N 3/04* (2023.01)
*G06N 3/049* (2023.01)

(56) References Cited

U.S. PATENT DOCUMENTS

2018/0342084 A1 11/2018 Yonetsuji
2019/0087982 A1* 3/2019 Matsumoto ............ G06T 11/001
2020/0118305 A1* 4/2020 Yonetsuji ................ G06T 11/20

OTHER PUBLICATIONS

S. Iizuka et al. "Let there be Color !: Joint End-to-end Learning of Global and Local Image Priors for Automatic Image Colorization with Simultaneous Classification". ACM Transaction on Graphics (Proc. of SIGGRAPH), 35(4):110, 2016 (7 pages).
T. Yonetsuji "Distinctive Features of Coloring Models" Chapter 2: Coloring Techniques for Manga/Line Drawings. 2-2: Line Drawing Automatic Coloring Service "PaintsChainer". Journal of the Institute of Image Information and Television Engineers, vol. 72, No. 3, pp. 47-51; May 1, 2018 (5 pages).
International Search Report issued in International Application No. PCT/JP2019/050853, dated Feb. 25, 2020 (5 pages).
Written Opinion issued in International Application No. PCT/JP2019/050853; dated Feb. 25, 2020 (4 pages).

* cited by examiner

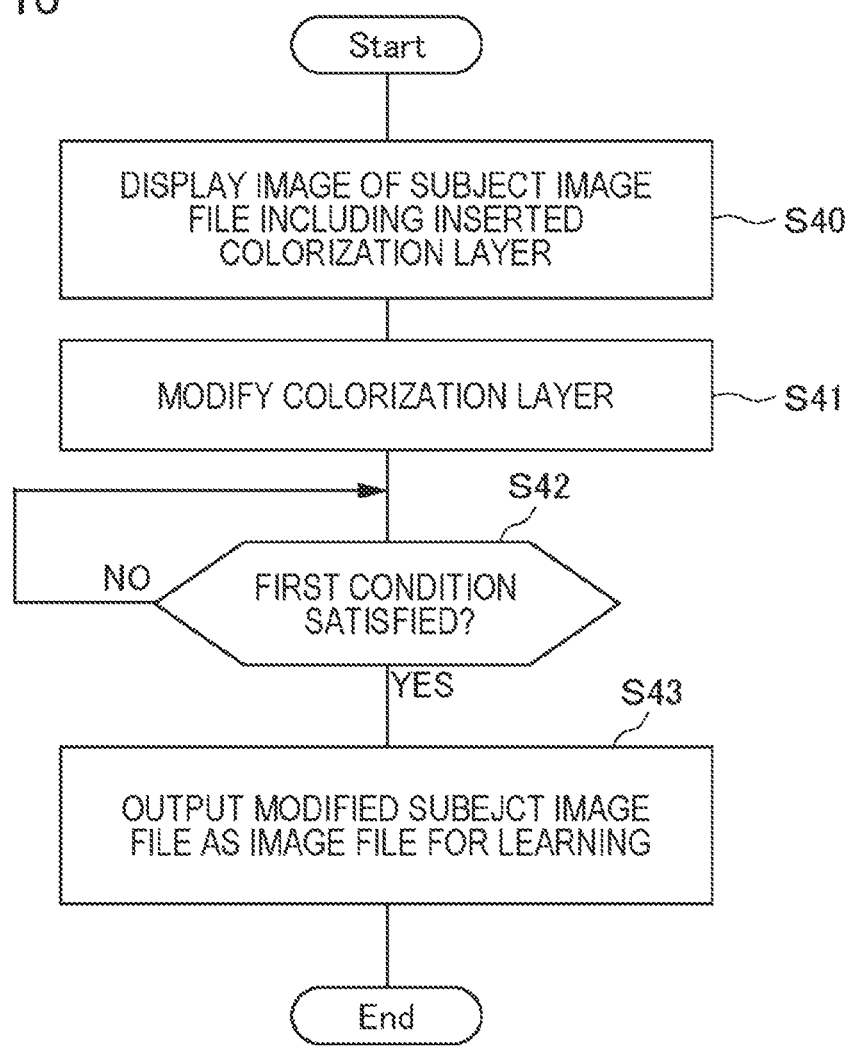

IMAGE PROCESSING METHOD, IMAGE PROCESSING SYSTEM, AND PROGRAM FOR COLORIZING LINE-DRAWING IMAGES USING MACHINE LEARNING

TECHNICAL FIELD

The present invention relates to image processing methods, image processing systems, and programs.

BACKGROUND ART

Non-Patent Literatures 1 and 2 disclose technologies relating to pix2pix.

CITATION LIST

Non Patent Literature

{NPL 1}
Phillip Isola, Jun-Yan Zhu, Tinghui Zhou, Alexei A. Efros, Image-to-Image Translation with Conditional Adversarial Networks, arXiv:1611.07004, 2016.
{NPL 2}
Satoshi Iizuka, Edgar Simo-Serra, and Hiroshi Ishikawa. "Let there be Color!: Joint End-to-end Learning of Global and Local Image Priors for Automatic Image Colorization with Simultaneous Classification". ACM Transaction on Graphics (Proc. of SIGGRAPH), 35(4):110, 2016.

SUMMARY OF INVENTION

Technical Problem

With conventional automatic colorization technologies, it has not been possible to highly accurately colorize line drawings of existing characters, etc. in games, animations, etc. It is an object of the present, invention to highly accurately colorize line drawings of existing characters, etc. in games, animations, etc.

Solution to Problem

The present invention provides an image processing method wherein a computer:
stores learning data including a pair of a line-drawing image and a colorized image for each element;
generates an estimation model for estimating the colorized image from the line-drawing image for each element through machine learning using the learning data of that element;
obtains a subject line-drawing image, which is the line-drawing image of a subject that is to be colorized;
identifies the element corresponding to the subject line-drawing image;
generates a subject colorized image, which is the colorized image that is to be paired with the subject line-drawing image, on the basis of the estimation model corresponding to the identified element and the subject line-drawing image;
generates a colorization layer of an image file including a line-drawing layer and the colorization layer by using the subject colorized image;
inserts the generated colorized layer into a subject image file, which is the image file including the line-drawing layer corresponding to the subject line-drawing image;
modifies, on the basis of a user input, the colorization layer of the subject image file in which the colorization layer has been inserted;
extracts the modified colorization layer and the corresponding line-drawing layer as the image pair for learning; and
stores a pair of the line-drawing image of the extracted line-drawing layer and the colorized image of the extracted colorization layer, as the learning data, in association with the element corresponding to the estimation model used when generating the subject colorized image.

The present invention also provides an image processing method wherein a computer:
stores learning data including a pair of a line-drawing image and a colorized image for each element;
obtains an image file for learning, the image file including a line-drawing layer and a colorization layer;
extracts the line-drawing layer and the colorization layer from the image file for learning;
identifies the element corresponding to an image represented by the image file for learning;
stores a pair of the line-drawing image of the extracted line-drawing layer and the colorized image of the extracted colorization layer, as the learning data, in association with the identified element;
generates an estimation model for estimating the colorized image from the line-drawing image for each element through machine learning using the learning data of that element;
obtains a subject line-drawing image, which is the line-drawing image of a subject that is to be colorized;
identifies the element corresponding to the subject line-drawing image;
generates a subject colorized image, which is the colorized image that is to be paired with the subject line-drawing image, on the basis of the estimation model corresponding to the element corresponding to the subject line-drawing image and the subject line-drawing image;
generates the colorization layer of the image file by using the subject colorized image;
inserts the generated colorized layer into a subject image file, which is the image file including the line-drawing layer corresponding to the subject line-drawing image;
modifies, on the basis of a user input, the colorization layer of the subject image file in which the colorization layer has been inserted; and
obtains the subject image file including the modified colorized layer as the image file for learning.

The present invention also provides an image processing system including:
a means for storing learning data including a pair of a line-drawing image and a colorized image for each element;
a means for generating an estimation model for estimating the colorized image from the line-drawing image for each element through machine learning using the learning data of that element;
a means for obtaining a subject line-drawing image, which is the line-drawing image of a subject that is to be colorized;
a means for identifying the element corresponding to the subject line-drawing image;
a means for generating a subject colorized image, which is the colorized image that is to be paired with the subject line-drawing image, on the basis of the estimation model corresponding to the identified element and the subject line-drawing image;

a means for generating a colorization layer of an image file including a line-drawing Layer and the colorization layer by using the subject colorized image;

a means for inserting the generated colorized layer into a subject image file, which is the image file including the line-drawing layer corresponding to the subject line-drawing image;

a means for modifying, on the basis or a user input, the colorization layer of the subject image file in which the colorization layer has been inserted;

a means for extracting the modified colorization layer and the corresponding line-drawing layer as the image pair for learning; and a means for storing a pair of the line-drawing image of the extracted line-drawing layer and the colorized image of the extracted colorization layer, as the learning data, in association with the element corresponding to the estimation model used when generating the subject colorized image.

The present invention also provides a program for causing a computer to function as:

a means for storing learning data including a pair of a line-drawing image and a colorized image for each element;

a means for generating an estimation model for estimating the colorized image from the line-drawing image for each element through machine learning using the learning data of that element;

a means for obtaining a subject line-drawing image, which is the line-drawing image of a subject that is to be colorized;

a means for identifying the element corresponding to the subject line-drawing image;

a means for generating a subject colorized image, which is the colorized image that is to be paired with the subject line-drawing image, on the basis of the estimation model corresponding to the identified element and the subject line-drawing image;

a means for generating a colorization layer of an image file including a line-drawing layer and the colorization layer by using the subject colorized image;

a means for inserting the generated colorized layer into a subject image file, which is the image file including the line-drawing layer corresponding to the subject line-drawing image;

a means for modifying, on the basis of a user input, the colorization layer of the subject image file in which the colorization layer has been inserted;

a means for extracting the modified colorization layer and the corresponding line-drawing layer as the image pair for learning; and a means for scoring a pair of the line-drawing image of the extracted line-drawing layer and the colorized image of the extracted colorization layer, as the learning data, in association with the element corresponding to the estimation model used when generating the subject colorized image.

Advantageous Effects of Invention

The present invention makes it possible to highly accurately colorize line drawings of existing characters, etc. in games, animations, etc.

BRIEF DESCRIPTION OF DRAWINGS

The abovementioned object, other objects, features, and advantages will become more apparent in view of a preferred embodiment described below and the following accompanying drawings.

FIG. 10 is a chart showing an example flow of processing by the image processing system according to the present embodiment.

DESCRIPTION OF EMBODIMENTS

Embodiment

First, an overview of the present embodiment will be described. In the present embodiment, a computer executes the following processing.

(1) For each existing element (e.g., a character or a costume) in a game, an animation, or the like, learning data including pairs of line drawing images and colorized images are stored. Then, machine learning is performed for each element, and an estimation model for estimating a colorized image from a line drawing image is generated for each element.

(2) When a line drawing image that is to be colorized is given, an element corresponding to the line drawing image is identified, and a colorized image that is to be paired with the line drawing image is generated on the basis of the estimation model corresponding to the identified element and the line drawing image.

(3) When the generated colorized image is manually modified, the modified colorized image and the line drawing image corresponding thereto are stored as new learning data.

Figure 1:
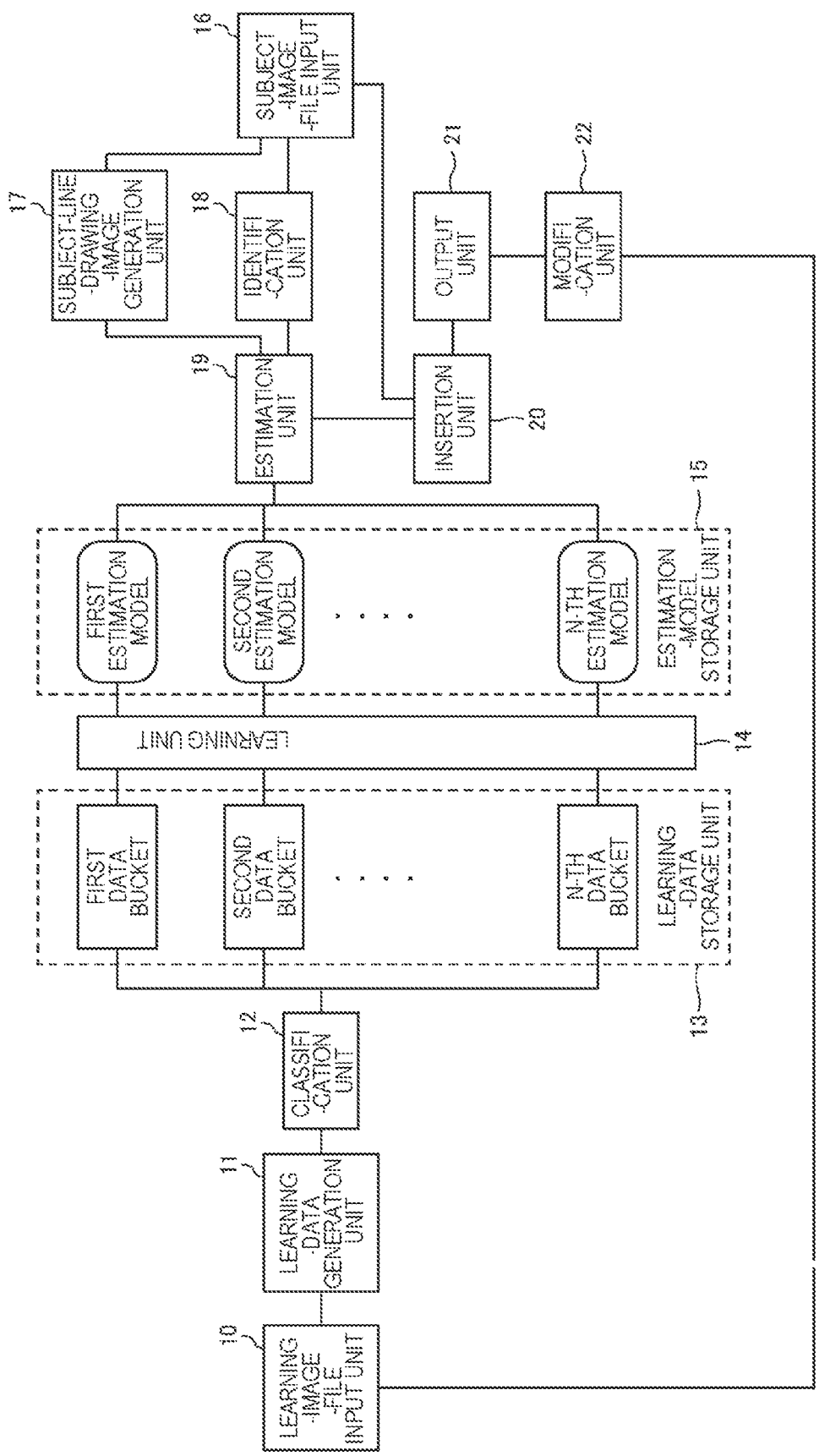
FIG. 1 is an example functional block diagram of an image processing system according to the present embodiment.

Next, the configuration of an image processing system according to the present embodiment will be described. FIG. 1 shows an example functional block diagram of the image processing system. As shown in the figure, the image processing system includes a learning-image-file input unit 10, a learning-data generation unit 11, a classification unit 12, a learning-data storage unit 13, a learning unit 14, an estimation-model storage unit 15, a subject-image-file input unit 16, a subject-line-drawing-image generation unit 17, an identification unit 13, an estimation unit 19, an insertion unit 20, an output unit 21, and a modification unit 22.

The image processing system may be realized by a plurality of physically and/or logically separate devices. In this case, each of the plurality of functional units shown in FIG. 1 is realized by one of the plurality of devices. Alternatively, the image processing system may be realized by a physically and logically single device. In this case, all of the plurality of functional units shown in FIG. 1 are realized by the single device.

Now, an example hardware configuration of the image processing system will be described. The functional units provided in the image processing system according to the present embodiment are realized by an arbitrary combination of hardware and software mainly including an arbitrary computer having a central processing unit (CPU), a memory, programs loaded into the memory, a storage unit that stores the programs (which can store programs already stored at the time of shipping of the device as well as programs stored in a storage medium, such as a compact disc (CD), or downloaded from a server or the like on the Internet), such as a hard disk, and a network connection interface. Furthermore, it would be understood by a person skilled in the art that there are various modifications concerning the method of realization and the device.

Figure 2:
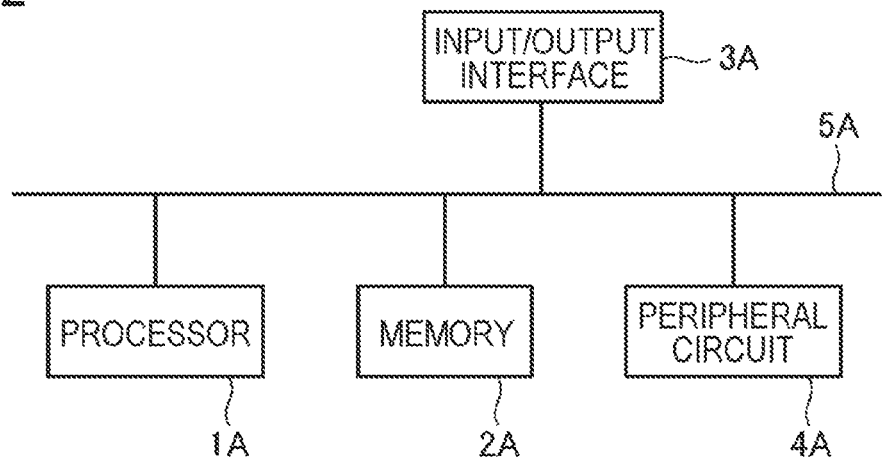
FIG. 2 is a diagram showing an example hardware configuration of the image processing system according to the present embodiment.

FIG. 2 is a block diagram showing an example hardware configuration of the image processing system according to the present embodiment. As shown in FIG. 2, the image processing system includes a processor 1A, a memory 2A, an input/output interface 3A, a peripheral circuit 4A, and a bus 5A. The peripheral circuit 4A includes various modules. The image processing system need not include the peripheral circuit 4A. In the case where the image processing system is configured of a plurality of physically and/or logically separate devices, each of the plurality of devices may include the hardware configuration described above.

The bus 5A is a data transmission path that allows the processor 1A, the memory 2A, the peripheral circuit 4A, and the input/output interface 3A to mutually send and receive data. The processor 1A is a computational processing device, such as a CPU or a graphics processing unit (GPU). The memory 2A is a memory such as a random access memory (RAM) or a read only memory (ROM). The input/output interface 3A includes an interface for obtaining information from an input device, an external device, an external server, an external sensor, etc., an interface for outputting information to an output device, an external device, an external, server, etc., and so forth. The input device is, for example, a keyboard, a mouse, or a microphone. The output device is, for example, a display, a speaker, a printer, or a mailer. The processor 1A can issue instructions to the individual modules and can perform computations on the basis of the results of those computations.

Next, the individual functional configurations of the plurality of functional units shown in FIG. 1 will be described.

The learning-image-file input unit 10 accepts the input of an image file for learning (hereinafter referred to as a "learning image file"). The image processing system can obtain a learning image file by the operation of the learning-image-file input unit 10 accepting the input of a learning image file.

Figure 3:
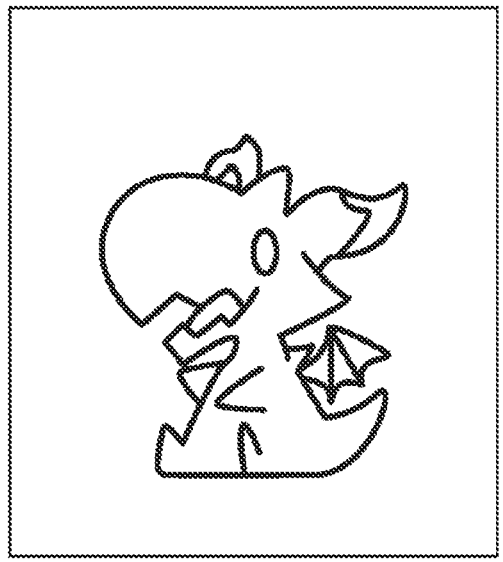
FIG. 3 is an illustration showing an example image of a line-drawing layer in the present embodiment.
Figure 4:
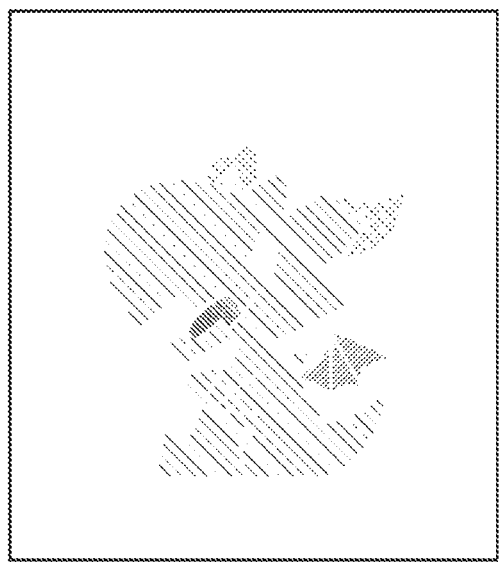
FIG. 4 is an illustration showing an example image of a colorization layer in the present embodiment.
Figure 5:
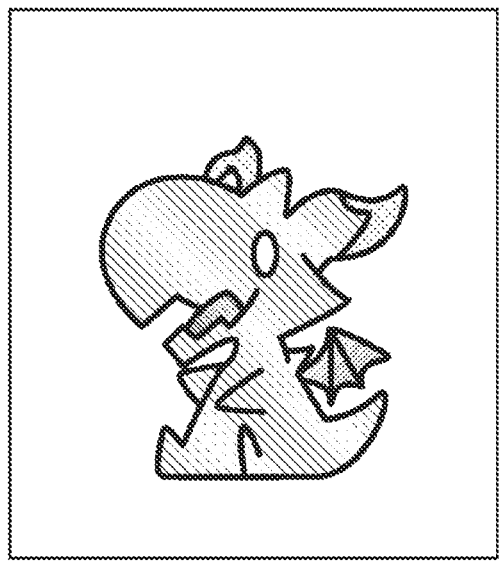
FIG. 5 is an illustration showing an example image of a base-painting layer in the present embodiment.

Now, the image file will be described. The image file in the present embodiment has a layer structure, which is a standard data structure that is used when a user (e.g., an illustrator) creates an image. The image file at least includes a base-painting layer. The base-painting layer includes a line-drawing layer and a colorization layer. The line-drawing layer represents a line drawing drawn by using only lines. The colorization layer does not include a line drawing and represents the content of colorization applied to a line drawing. Now, an example of each of the line-drawing layer, the colorization layer, and the base-painting layer will be given. FIG. 3 shows an example image of the line-drawing layer. FIG. 4 shows an example image of the colorization layer. FIG. 5 shows an example image of the base-painting layer.

Figure 6:
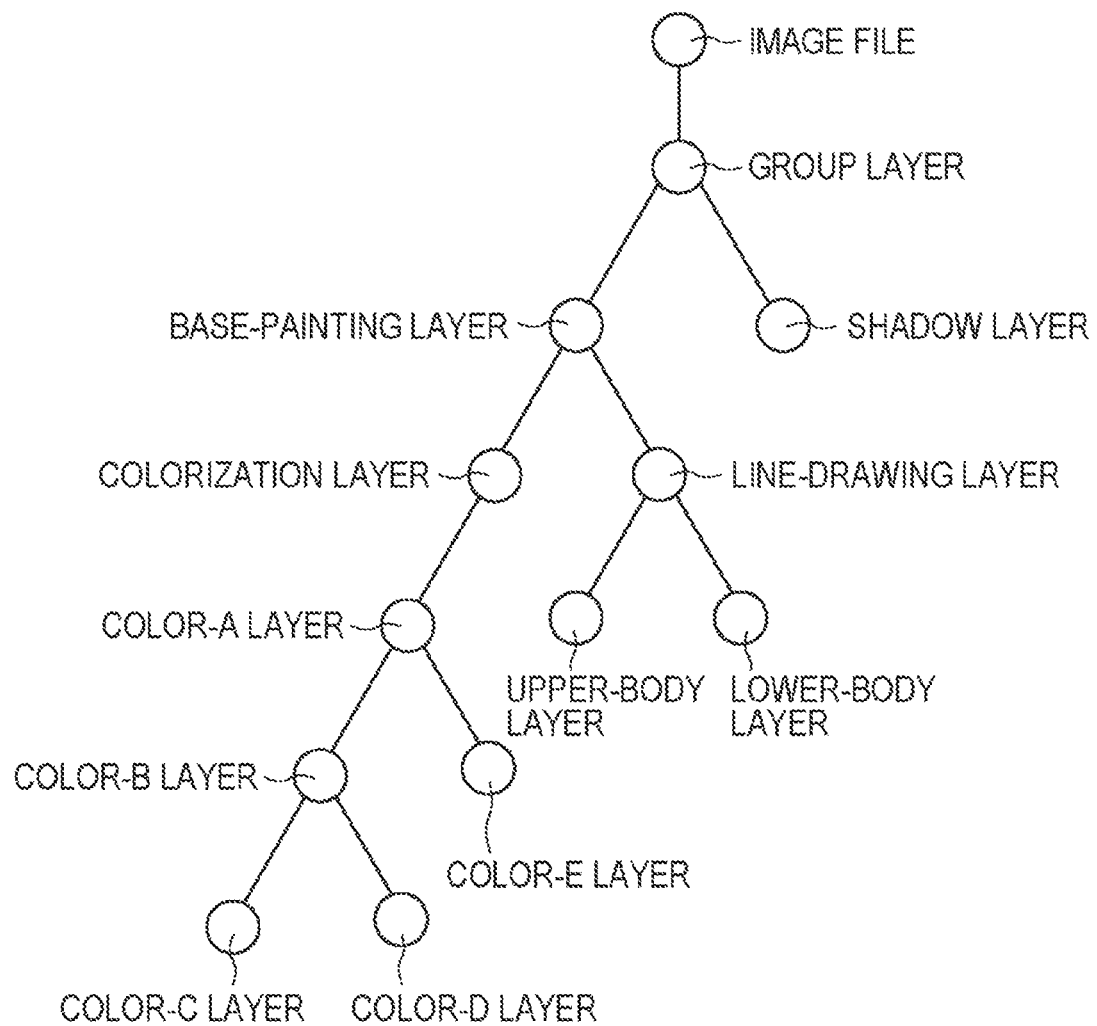
FIG. 6 is an illustration schematically showing an example layer structure of an image file in the present embodiment.

Next, FIG. 6 schematically shows an example layer structure of the image file in the present embodiment. In the case of the example shown, the image file includes a base-painting layer and a shadow layer representing shadow. The base-painting layer includes a line-drawing layer and a colorization layer. The line-drawing layer includes an upper-body layer representing the upper body of a character and a lower-body layer representing the lower body of the character. The colorization layer includes a plurality of layers for individual colors. Note that the layer structure shown is just an example, and there is no limitation thereto.

Examples of the image file in the present embodiment include a PSD (Adobe Photoshop (registered trademark)) file and an AI (Adobe Illustrator (registered trademark)) file, but there is no limitation thereto.

Referring back to FIG. 1, the learning-data generation unit 11 generates learning data from the learning image file input to the learning-image-file input unit 10. Specifically, the learning-data generation unit 11 extracts the line-drawing layer and the colorization layer from the learning image file. Then, the learning-data generation unit 31 generates a line drawing image and a colorized image by respectively converting the extracted line-drawing layer and colorization layer into a predetermined file format that is suitable for machine learning. A pair of a line drawing image and a colorized image generated from a single learning image file constitutes learning data.

The line-drawing image included in the learning data is an image represented in the predetermined file format suitable for machine learning and representing the same content as the line-drawing layer included in the learning image file. Furthermore, the colorized image included in the learning data is an image represented in the predetermined file format suitable for machine learning in the present embodiment and representing the same content as the colorization layer included in the learning image file.

Examples of the predetermined file format suitable for machine learning in the present embodiment include a non-compressed raster image, such as the BMP (bitmap) format, and a reversibly compressed raster image, such as a PNG (Portable Network Graphics) file, but there is no limitation thereto.

Now, a specific example of processing for extracting the line-drawing layer and the colorization layer from the learning image file will be described.

The learning-data generation unit 11 can extract the line-drawing layer and the colorization layer on the basis of information (metadata) identifying each of the plurality of layers included in the learning image file. Examples of the information identifying each of the plurality of layers include a layer name, a layer ID (identifier), a layer number, and structural features, such as superordinate/subordinate relationships among layers, but there is no limitation thereto.

For example, rules for specifying the individual layer names, layer IDs, layer numbers, etc. of the line-drawing layer and the colorization layer are dictated in advance. For example, the rules dictate that items of predetermined information individually identifying the line-drawing layer and the colorization layer be added to the individual layer names, layer IDs, layer numbers, etc. of the line-drawing layer and the colorization layer. A user who generates an image file specifies the layer name, the layer ID, the layer number, etc. of each layer according to the rules. This enables the learning-data generation unit 11 to extract the line-drawing layer and the colorization layer from the learning image file on the basis of the layer name, the layer ID, the layer number, etc.

Alternatively, for example, rules concerning superordinate/subordinate relationships among a plurality of layers included in an image file are dictated in advance. For example, the rules dictate the following: "Among a plurality of layers included in a group layer, the base-paint layer is located uppermost. Furthermore, among a plurality of layers included in the base-painting layer, the line-drawing layer is located uppermost, and the colorization layer is located next." A user who generates an image file specifies superordinate/subordinate relationships among a plurality of layers included in the image file according to the rules. This enables the learning-data generation unit 11 to extract the line-drawing layer and the colorization layer from the learning image file on the basis of the superordinate/subordinate relationships among the plurality of layers included in the image file.

The classification unit 12 identifies the element corresponding to the image represented by the learning image file. "The element, corresponding to the image" refers to the element drawn in the image. The element is an existing character, costume, or the like in a game, animation, or the like. It is assumed that a single element is drawn in an image represented by a single image file.

Furthermore, the classification unit 12 stores the learning data generated by the learning-data generation unit 11, in association with the identified element, in the learning-data storage unit 13.

Now, a specific example of processing for identifying the element, corresponding to the image represented by the learning image file will be described.

The classification unit 12 can identify the abovementioned element, for example, on the basis of the name of the learning image file. For example, rules for specifying the name of an image file are dictated in advance. For example, the rules dictate that predetermined information (e.g., a character name or a costume name) identifying the element corresponding to the image represented by each image file be added to the name of that image file. A user who generates an image file specifies the name of the image file according to the rules. This enables the classification unit 12 to identify the element corresponding to the image represented by the learning image file on the basis of the name of the image file.

Alternatively, a user may perform an input for specifying an element to the image processing system. Then, the classification unit 12 may identify the element on the basis of the content specified by the user.

the learning-data storage unit 13 stores learning data including a pair of a line-drawing image and a colorized image for each element. For example, as shown in the figure, the learning-data storage unit 13 may include data buckets individually corresponding to a plurality of elements and may accumulate learning data for the individual elements in the individual data buckets.

The learning unit 14 performs machine learning for each element by using the learning data of that element, stored in the learning-data storage unit 13, thereby generating an estimation model for estimating a colorized image from a line-drawing image. An example of the method of machine learning is a generative neural network, such as a generative adversarial network (GAN), but there is no limitation thereto. For example, the learning unit 14 may be configured of pix2pix.

The estimation-model storage unit 15 stores an estimation model for each element, generated by the learning unit 14. The estimation-model storage unit 15 stores the estimation model generated on the basis of the learning data of each element, in association with that element.

The subject-image-file input unit 16 accepts the input of an image file that is to be colorized (hereinafter referred to as a "subject image file"). The image processing system can obtain a subject image file by the operation of the subject-image-file input unit 16 accepting the input of the subject image file. The subject image file includes the line-drawing layer and does not include the colorization layer.

The subject-line-drawing-image generation unit 17 extracts the colorization layer from the subject, image file and converts the extracted colorization layer into a predetermined file format, thereby obtaining a line-drawing image that is to be colorized (hereinafter referred to as a "subject line-drawing image"). The predetermined file format is the same as the file format of the line-drawing image included in the learning data. The subject-line-drawing-image generation unit 17 can extract the colorization layer from the subject image file by the same method as the learning-data generation unit 11.

The identification unit 18 identifies the element corresponding to the subject line-drawing image. The identification unit 18 can identify the element corresponding to the subject line-drawing image by the same means as a "means for identifying the element corresponding to the image represented by the learning image file (classification unit 12)".

The estimation unit 19 generates a colorized image that is to be paired with the subject line-drawing image (hereinafter referred to as a "subject colorized image") on the basis of the estimation model corresponding to the element identified by the identification unit 18 and the subject line-drawing image. The estimation model corresponding to a first element is the estimation model, stored in association with the first element in the estimation-model storage unit 15.

The insertion unit 20 generates the colorization layer by using the subject colorized image generated by the estimation unit 19. Then, the insertion unit 20 inserts the generated colorization layer into the subject image file input to the subject-image-file input unit 16. Hereinafter, the subject image file in which the colorization layer has been inserted by the insertion unit 20 will be referred to as an "already-colorized image file". Furthermore, the image represented by the already-colorized image file will be referred to as an "already-colorized image". Note that the insertion unit 20 can execute noise removal, processing for dividing the colorization layer into a plurality of layers, etc.

The output unit 21 processes the already-colorized image file and outputs an already-colorized image. The output unit 21 realizes the output of the already-colorized image via any type of output device, such as a display, a printer, a mailer, or a projection device.

The modification unit 22 modifies the colorization layer of the already-colorized image file on the basis of a user input. Furthermore, after modifying the colorization layer of the already-colorized image file, when a first predetermined condition is satisfied, the modification unit 22 inputs the already-colorized image file in which the colorization layer has been modified, as a learning image file, to the learning-image-file input unit 10.

The first predetermined condition is, for example, "a predetermined user input from the user has been accepted". The predetermined user input may be the input of an instruction for registering, as a learning image file, the already-colorized image file in which the colorization layer has been modified.

Alternatively, the predetermined user input, may be an input for locking a predetermined layer so as to prohibit editing of the colorization layer. The predetermined layer is the colorization layer, the base-painting layer, or the like. It is presumable that the user locks the predetermined layer to prohibit editing of the colorization layer upon finishing modification of the colorization layer. That is, it is presumable that, in the case where the predetermined layer has been locked to prohibit editing of the colorization layer, modification of the colorization layer has been finished, when the data has become suitable as data for learning. By outputting an already-colorized image file as a learning image file in response to locking of the predetermined layer to prohibit editing of the colorization layer, it is possible to input data preferred as data for learning to the learning-image-file input unit 10 without requiring an unnecessary operation by the user.

Alternatively, the predetermined user input may be the input of an instruction for changing the subject of working from the colorization layer to another layer (e.g., the layer above the colorization layer). Also in this case, for the same reason as in the case of locking described above, it is possible to input data preferred as data for learning to the learning-image-file input unit 10 without requiring an unnecessary operation by the user.

Figure 7:
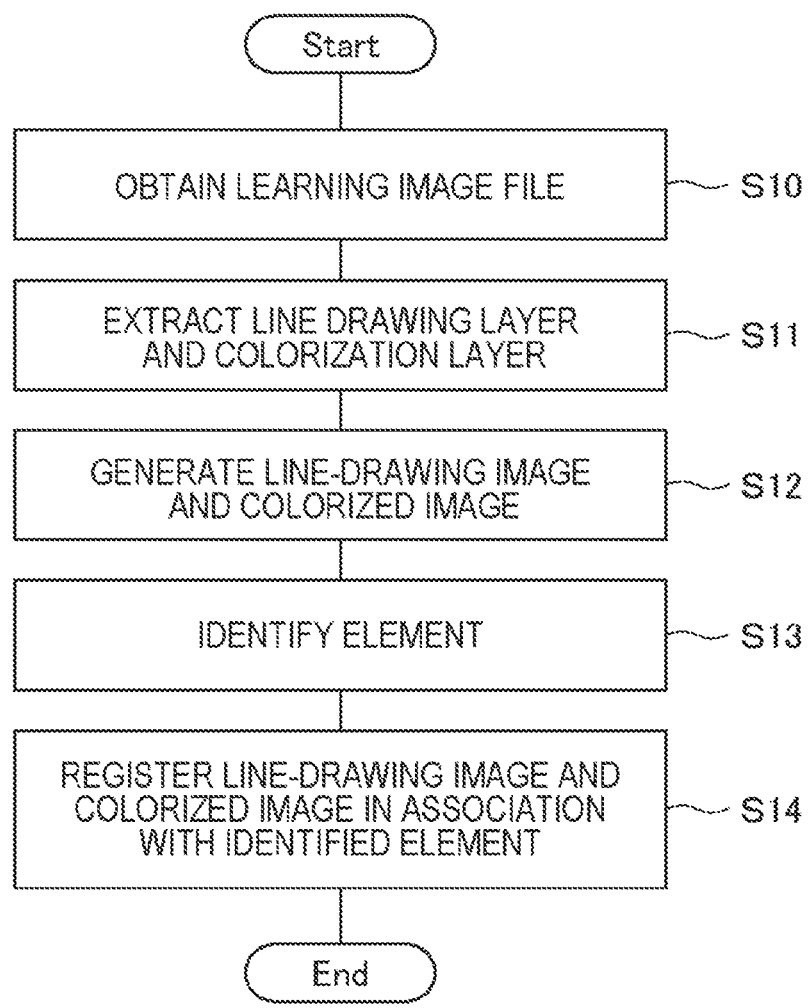
FIG. 7 is a chart showing an example flow of processing by the image processing system according to the present embodiment.

Next, an example flow of processing by the image processing system will be described with reference to a flowchart in FIG. 7. FIG. 7 shows an example flow of processing for registering learning data.

First, the image processing system obtains a learning image file (S10). Then, the image processing system extracts the line-drawing layer and the colorization layer from the learning image file obtained in S10 (S11). Then, the image processing system changes the individual file formats of the line-drawing layer and the colorization layer extracted in S11 to generate a line-drawing image and a colorized image represented in a predetermined file format that is suitable for machine learning (S12).

Then, the image processing system identifies the element corresponding to the image represented by the learning image file obtained in S10 (S13). Then, the image processing system registers learning data including a pair of the line-drawing image and the colorized image generated in S12, in association with the element identified in S13 (S14).

Note that the processing order of S11 to S13 is not limited to the order shown.

Figure 8:
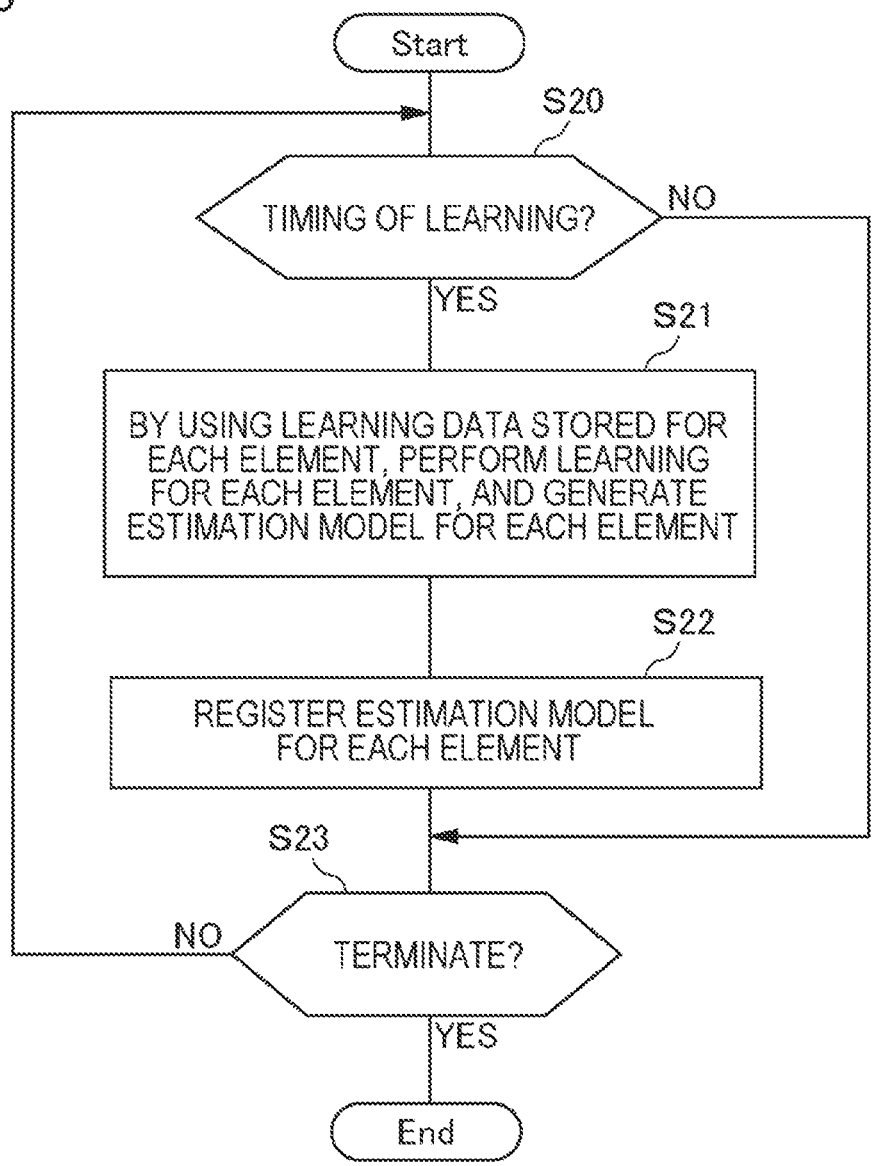
FIG. 8 is a chart showing an example flow of processing by the image processing system according to the present embodiment.

Next, another example flow of processing by the image processing system will be described with reference to a flowchart in FIG. 8. FIG. 8 shows an example flow of processing for generating estimation models.

The image processing system monitors the arrival of a timing for learning (S20). The timing for learning may be a timing at which new learning data has been added, a timing at which a predetermined number of items of learning data have been newly added, a timing at which a user input instructing the execution of learning has been received, a timing registered in advance (e.g., 0 o'clock every day or 0 o'clock every Monday), or other timings.

When the timing for learning arrives (Yes in S20), the image processing system performs machine learning for each element to generate an estimation model for that element by using learning data registered for that element (S21). Then, the image processing system registers the estimation model generated in S21 for each element (S22). Note that in S21, machine learning may be performed for all elements, or machine learning may be performed for some of the elements. For example, the image processing system may perform machine learning and may update estimation models only for elements for which new learning data has been added.

Figure 9:
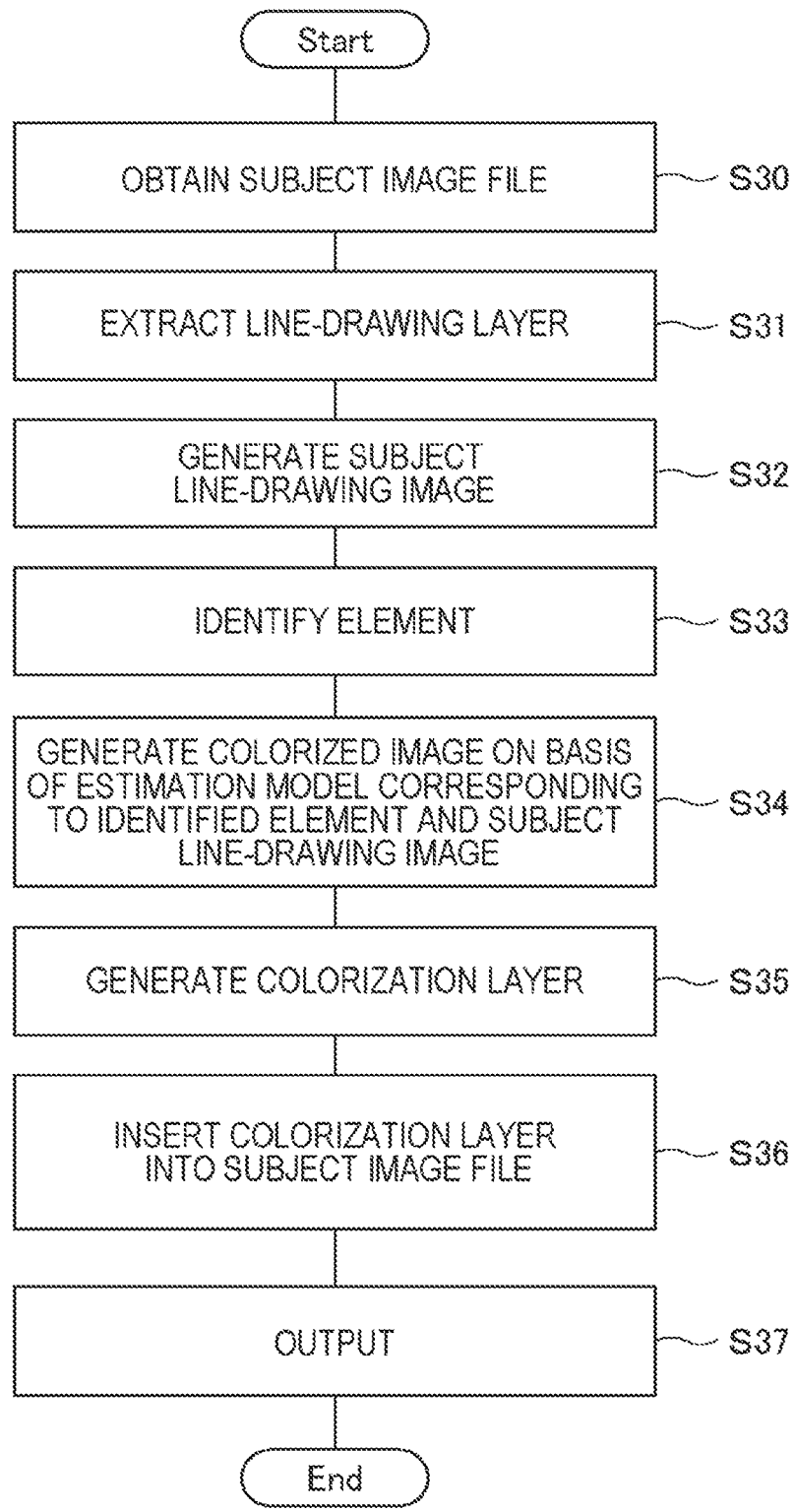
FIG. 9 is a chart showing an example flow of processing by the image processing system according to the present embodiment.

Next, another example flow of processing by the image processing system will be described with reference to a flowchart in FIG. 9. FIG. 9 shows an example flow of processing for automatically colorizing a subject image file.

First, the image processing system obtains a subject image file (S30). Then, the image processing system extracts the line-drawing layer from the subject image file obtained in S30 (S31). Then, the image processing system changes the file format of the line-drawing layer extracted in S31, thereby-generating a subject line-drawing image represented in a predetermined file format (S32). The predetermined file format is the same as the file format of the line-drawing image included in the learning data.

Then, the image processing system identifies the element corresponding to the image represented by the subject image file obtained in S30 (S33). Then, the image processing system generates a subject colorized image on the basis of the estimation model corresponding to the element identified in S33 and the subject line-drawing image generated in S32 (S34).

Then, the image processing system generates the colorization layer by using the subject colorized image generated in S34 (S35), and inserts the generated colorized layer into the subject image file obtained in S30 (S36). Then, the image processing system outputs the subject image file in which the colorized layer has been inserted (S37).

Note that the processing order of S31 to S33 is not limited to the order shown.

Next, another example flow of processing by the image processing system will be described with reference to the flowchart in FIG. 10. FIG. 10 shows an example flow of processing for modifying an already-colorized image file, which is a subject image file in which the colorization layer has been inserted through the processing in FIG. 9, and outputting the modified already-colorized image file as a learning image file.

The image processing system displays the image represented by the already-colorized image file, for example, on a display (S40). The user views the automatically colorized image displayed on the display, and modifies a predetermined layer as appropriate. It is assumed here that the image processing system modifies the colorization layer included in the already-colorized image file on the basis of a user input (S41).

Then, when a first condition for using the modified already-colorized image file as a learning image file is satisfied (Yes in S42), the image processing system outputs the modified already-colorized image file as a learning image file (S43). Then, the image processing system executes the processing in FIG. 7. Note that the first condition is the condition described earlier.

Meanwhile, when the first condition is not satisfied (No in S42), the image processing system waits until the first condition is satisfied. In this case, the image processing system may terminate the processing when a predefined termination condition is satisfied. The termination condition may be the acceptance of a user input for terminating the processing for modifying the already-colorized image file or may be other conditions.

Next, the operations and advantages of the present embodiment will be described.

The present embodiment relates to a method of configuring AI for automatically realizing highly accurate colorization serving as base painting for a line-drawing image created by a user, for example, with an existing element (e.g., a character or a costume) in a game, an animation, or the like.

A technical feature of the present embodiment is that classification of learning data, generation of estimation models, selection of an estimation model at the time of inference, learning data management at the time of feedback, etc. are performed while considering, as basic units, elements such as "characters" and "costumes", which are concepts unique to games and animations, thereby realizing human-in-the-loop deep learning (HITL-DL) that enables highly accurate learning of the features of individual elements, which are implicitly owned by users.

Here, human-in-the-loop refers to realizing learning in which user participation is presupposed, in a natural manner not imposing burdens on users. With conventional deep learning, which involves complex tuning, realizing HITL has been considered to be relatively difficult. The present embodiment establishes HITL for highly accurate automatic colorization serving as base painting in professional applications, for example, by adopting the following three features.

- When a learning image file (e.g., PSD) is input, the line-drawing layer and the colorization layer are extracted by using the layer names or the like. Then, a line-drawing image and a colorized image that serve as learning data are generated by using the extracted line-drawing layer and colorization layer. Then, the element corresponding to the learning mage file is identified by using the file name or the like, and the generated learning data is stored in association with the identified element. Then, machine learning is performed for each element to generate an estimation model for generating a colorized image from a line-drawing image for that element.
- When a subject image file is input for automatic colorization, the line-drawing layer is extracted by using the layer name or the like to generate a subject line-drawing image, and the element corresponding to the subject image file is identified by using the file name or the like. Then, a colorized image that is to be paired with the subject line-drawing image is generated on the basis of the estimation model corresponding to the identified element and the subject line-drawing image. Then, the colorization layer is generated on the basis of the generated colorized image, and is inserted into the subject image file.
- When the colorized layer generated through the automatic colorization described above is modified by a user, the subject Image file including the modified colorization layer is output as a learning image file.

These features make it possible to automatically learn human knowledge for base painting and to apply highly accurate colorization to existing elements. Furthermore, when a new element is added, it is possible to scalably add a new estimation model without affecting existing estimation models.

Furthermore, in the present embodiment, an image file that, is input to the image processing system for the purpose of learning and an image file that is output from the image processing system after colorization have the same file format. Thus, the computation system is closed, which makes it possible to execute permanent human-in-the-loop.

Furthermore, in the present embodiment, highly accurate estimation is realized by collectively using estimation models having low generalization performance individually for specific elements.

EXAMPLE

Next, an example will be described. First, data structures in the present example will be described. The present example is configured by using three data structures, namely, an image file D that is input to the image processing system, data buckets B that store learning data for individual elements, and an image file D' that is output from the image processing system.

The image file D can be defined as in Eq. (1). The file format of the image file D is, for example, a PSD file.

{Eq. 1}

$$D=\{L_1,L_2,\ldots,L_n\}|L_i \leftarrow \{L_{i+1},L_{i+2},\ldots,L_{i+x}\} \qquad (1)$$

Here, $L_i$ signifies the i-th layer, and non-cyclic parent/child relationships exist among the individual layers. $L_i$ has an arbitrary number of child elements.

The data buckets B include a plurality of data buckets for individual elements. A data bucket corresponding to an element a can be defined as in Eq. (2).

{Eq. 2}

$$B_a=\{s_1,c_1,s_2,c_2,\ldots,s_k,c_k\} \qquad (2)$$

Here, $s_k$ signifies the k-th line-drawing image, and $c_k$ signifies the k-th colorized image. A pair of $s_k$ and $c_k$ constitutes a single item of learning data. The file format of the line-drawing image and the colorized image is, for example, BMP files.

The image file D' has the same file format as the image file D. That is, the image file D that is input to the image processing system and the image file D' that is output from the image processing system have the same file format. The image file D' can be defined as in Eq. (3). The image file D' is, for example, a PSD file.

{Eq. 3}

$$D'=\{L_1,L_2,\ldots L_m\}|L_i \leftarrow \{L_{i+1},L_{i+2},\ldots,L_{i+x}\} \qquad (3)$$

Here, $L_i$ signifies the i-th layer, and non-cyclic parent/child relationships exist among the individual layers. $L_i$ has an arbitrary number of child elements.

Next, basic functions for realizing the present example will be described. In the present examples, two functions, normalize and append, are used as control functions for configuring human-in-the-loop, a learn function is used as a function for performing learning by using a GAN, and three functions, infer, denoise, and divide, are used as functions for performing automatic colorization. That is, six primitive functions in total are used in the present example.

The normalize function extracts the line-drawing layer and the colorization layer from the image file D having a layer structure, and performs a change in the file format, the adjustment of the image size, etc. to generate a line-drawing image $s_t$ and a colorized image $c_t$. Furthermore, the normalize function identifies the element a corresponding to the image represented by the image file D. The normalize function can be defined as in Eq. (4).

{Eq. 4}

$$\text{normalize}(D_t, w, h) \rightarrow \{a, s_t, c_t\} \quad (4)$$

Here, Dt signifies an image file that is to be processed, w and h signify the data size (width and height) of the line-drawing image $s_t$ and colorized image $c_t$ to be output. With a generative neural network, such as pix2pix, it is necessary that the size (numbers of pixels along the vertical and horizontal directions) of images serving as learning data be uniform. In the present example, these are normalized by using the normalize function.

The append function is a function that stores the image pair of the line-drawing image $s_t$ and the colorized image $c_t$ output from the normalize function in the data bucket $B_a$ corresponding to the element a output from the normalize function. The append function can be defined as in Eq. (5).

{Eq. 5}

$$\text{append}(B_a, s_t, c_t) \quad (5)$$

Here, $B_a$ signifies the data bucket corresponding to the element a.

The learn function performs machine learning on the basis of the learning data stored in the data bucket $B_a$ corresponding to the element a, and generates an estimation model $M_a$ for generating a colorized image from a line-drawing image corresponding to the element a. The learn function can be defined as in Eq. (6).

{Eq. 6}

$$\text{learn}(B_a) \rightarrow M_a \quad (6)$$

The learn function can be implemented by directly using an existing generative neural network, such as pix2pix.

The infer function is a function that receives the input of a line-drawing image $s_a$ corresponding to the element a and that automatically generates a colorized image $c_a$ by using the estimation model $M_a$ corresponding to the element a. The infer function can be defined as in Eq. (7).

{Eq. 7}

$$\text{infer}(M_a, s_a) \rightarrow c_2 \quad (7)$$

The denoise function is a function that removes noise while assuming that the result of automatic colorization represents plain painting (denoising filter). With GAN-based automatic colorization, there is a tendency for noise to be introduced in regions where features tend to become lost, such as drawing edges, regions where lines are densely drawn, etc. Thus, it is possible to improve the accuracy of base painting or plain painting by introducing a denoising filter that works as image processing such as levelling. The denoise function can be defined as in Eq. (8).

{Eq. 8}

$$\text{denoise}(c) \rightarrow c' \quad (8)$$

Here, c signifies a colorized image generated by the infer function, and c' signifies a colorized image after executing noise removal.

The divide function executes processing on the colorized image c' after executing the noise removal, such as a change in the file format and per-color layer division, thereby generating the colorization layer of the image file. For example, when noise has been removed by the denoise function such that a single region is to be painted in a single color, it becomes possible to perform per-color division into layers. The per-color layer division described above makes it possible for a user to readily perform editing and modification. Furthermore, the divide function inserts the generated colorization layer into the image file including the line-drawing layer corresponding to the line-drawing image $s_a$ that is to be colorized, input to the infer function. The divide function can be defined as in Eq. (9).

{Eq. 9}

$$\text{divide}(c') \rightarrow D' \quad (9)$$

Here, D' signifies an image file that is output from the divide function, which includes the line-drawing layer corresponding to the line-drawing image $s_a$ that is to be colorized, input to the infer function, and in which the colorization layer generated by the divide function has been inserted.

The learning process in the present example is as follows.

Step-L1: The normalize function is applied to an image file D for learning.
Step-L2: The append function is executed to store the results of Step-L1 in the learning buckets B for individual elements.
Step-L3: The learn function is applied to the individual learning buckets $B_a$ to generate learning models $M_a$.

The inference process in the present example is as follows.

Step-I1: When a user inputs a line-drawing image s corresponding to a specific element a to the image processing system, the image processing system applies the infer function to the line-drawing image s by using the learning model $M_a$ corresponding to the element a, thereby generating a colorized image c.
Step-I2: The denoise function is applied to the colorized image c obtained in Step-I1, thereby obtaining a colorized image c' in which noise has been removed.
Step-I3: The divide function is applied to the colorized image c' obtained in Step-I2, thereby obtaining an image file D' having a layer structure.

The process of modification by the user in the present example is as follows.

Step-H1: The colorization layer of the image file D' output in Step-I3 is modified, and when the modified image file D' is output as an image file D for learning, the learning process stating from Step-L1 described above is executed.

As described above, when modification is manually performed, Step-L1, which is the start of the learning process, is invoked, whereby permanent improvement according to the present invention is realized.

Examples of reference modes are appended below.

1. An image processing method wherein a computer:
   stores learning data including a pair of a line-drawing image and a colorized image for each element;
   generates an estimation model for estimating the colorized image from the line-drawing image for each element through machine learning using the learning data of that element;
   obtains a subject line-drawing image, which is the line-drawing image of a subject that is to be colorized;
   identifies the element corresponding to the subject line drawing image;
   generates a subject colorized image, which is the colorized image that is to be paired with the subject line-drawing image, on the basis of the estimation model corresponding to the identified element and the subject line-drawing image;

generates a colorization layer of an image file including a line-drawing layer and the colorization layer by using the subject colorized image;
inserts the generated colorized layer into a subject image file, which is the image file including the line-drawing layer corresponding to the subject line-drawing image;
modifies, on the basis of a user input, the colorization layer of the subject image file in which the colorization layer has been inserted;
extracts the modified colorization layer and the corresponding line-drawing layer as the image pair for learning; and
stores a pair of the line-drawing image of the extracted line-drawing layer and the colorized image of the extracted colorization layer, as the learning data, in association with the element corresponding to the estimation model used when generating the subject, colorized image.

2. An image processing method wherein a computer:
stores learning data including a pair of a line-drawing image and a colorized image for each element;
obtains an image file for learning, the image file including a line-drawing layer and a colorization layer;
extracts the line-drawing layer and the colorization layer from the image file for learning;
identifies the element corresponding to an image represented by the image file for learning;
stores a pair of the line-drawing image of the extracted line-drawing layer and the colorized image of the extracted colorization layer, as the learning data, in association with the identified element;
generates an estimation model for estimating the colorized image from the line-drawing image for each element through machine learning using the learning data of that element;
obtains a subject line-drawing image, which is the line-drawing image of a subject that is to be colorized;
identifies the element corresponding to the subject line-drawing image;
generates a subject colorized image, which is the colorized image that is to be paired with the subject line-drawing image, on the basis of the estimation model corresponding to the element corresponding to the subject line-drawing image and the subject line-drawing image;
generates the colorization layer of the image file by using the subject colorized image;
inserts the generated colorized layer into a subject image file, which is the image file including the line-drawing layer corresponding to the subject line-drawing image;
modifies, on the basis of a user input, the colorization layer of the subject image file in which the colorization layer has been inserted; and
obtains the subject image file including the modified colorized layer as the image file for learning.

3. An image processing method according to 1 or 2, wherein the computer extracts the line-drawing layer and the colorization layer from the image file on the basis of information individually identifying a plurality of layers included in the image file.

4. An image processing method according to any of 1 to 3,
wherein the computer identifies the element corresponding to the image represented by the image file on the basis of a name of the image file.

5. An image processing method according to any of 1 to 4,
wherein after modifying the colorization layer of the subject image file on the basis of the user input, the computer, upon accepting a predetermined user input, obtains the subject image file including the modified colorization layer as the image file for learning.

6. An image processing method according to any of 1 to 5,
wherein the single element is drawn in the image represented by the single image file for learning.

7. An image processing system including:
a means for storing learning data including a pair of a line-drawing image and a colorized image for each element;
a means for generating an estimation model for estimating the colorized image from the line-drawing image for each element through machine learning using the learning data of that element;
a means for obtaining a subject line-drawing image, which is the line-drawing image of a subject that is to be colorized;
a means for identifying the element corresponding to the subject line-drawing image;
a means for generating a subject colorized image, which is the colorized image that is to be paired with the subject line-drawing image, on the basis of the estimation model corresponding to the identified element and the subject line-drawing image;
a means for generating a colorization layer of an image file including a line-drawing layer and the colorization layer by using the subject colorized image;
a means for inserting the generated colorized layer into a subject image file, which is the image file including the line-drawing layer corresponding to the subject line-drawing image;
a means for modifying, on the basis of a user input, the colorization layer of the subject image file in which the colorization layer has been inserted;
a means for extracting the modified colorization layer and the corresponding line-drawing layer as the image pair for learning; and
a means for storing a pair of the line-drawing image of the extracted line-drawing layer and the colorized image of the extracted colorization layer, as the learning data, in association with the element corresponding to the estimation model used when generating the subject colorized image.

8. A program for causing a computer to function as:
a means for storing learning data including a pair of a line-drawing image and a colorized image for each element;
a means for generating an estimation model for estimating the colorized image from the line-drawing image for each element through machine learning using the learning data of that element;
a means for obtaining a subject line-drawing image, which is the line-drawing image of a subject that is to be colorized;
a means for identifying the element corresponding to the subject line-drawing image;
a means for generating a subject colorized image, which is the colorized image that is to be paired with the subject line-drawing image, on the basis of the estimation model corresponding to the identified element and the subject line-drawing image;
a means for generating a colorization layer of an image file including a line-drawing layer and the colorization layer by using the subject colorized image;

a means for inserting the generated colorized layer into a subject image file, which is the image file including the line-drawing layer corresponding to the subject line-drawing image;

a means for modifying, on the basis of a user input, the colorization layer of the subject image file in which the colorization layer has been inserted;

a means for extracting the modified colorization layer and the corresponding line-drawing layer as the image pair for learning; and a means for storing a pair of the line-drawing image of the extracted line-drawing layer and the colorized image of the extracted colorization layer, as the learning data, in association with the element corresponding to the estimation model used when generating the subject colorized image.

This application claims priority based on Japanese Patent Application No. 2018-247800 filed on Dec. 28, 2018, which is incorporated herein in its entirety.

The invention claimed is:

1. An image processing method that is performed by a computer, the image processing method comprising:

storing learning data comprising a pair of a line-drawing image and a colorized image for a plurality of elements, wherein the plurality of elements are game characters within a computer game;

generating an estimation model for estimating the colorized image from the line-drawing image for the plurality of elements through machine learning using the learning data of the plurality of elements;

obtaining a subject line-drawing image, which is the line-drawing image of a subject that is to be colorized;

identifying a first element corresponding to the subject line-drawing image as an identified element;

generating a subject colorized image using an infer function, wherein the subject colorized image is the colorized image that is to be paired with the subject line-drawing image, based on the estimation model corresponding to the identified element and the subject line-drawing image, wherein the infer function automatically generates the subject colorized image using the subject line-drawing image as an input;

removing noise from the subject colorized image using a denoising function, wherein the denoising function performs a denoising filter on the subject colorized image;

generating a first colorization layer of a first image file using the subject colorized image to produce a generated colorization layer, wherein the first image file is based on a data structure comprising a base-painting layer comprising a first line-drawing layer and the first colorization layer, and wherein the first line-drawing layer represents a line drawing drawn using only lines, and wherein the first colorization layer does not include a line drawing and represents content of colorization for the line drawing;

inserting the generated colorization layer into a subject image file, which is the first image file comprising the first line-drawing layer corresponding to the subject line-drawing image;

modifying, based on a user input, the first colorization layer of the subject image file to produce a modified colorization layer;

extracting the modified colorization layer and the first line-drawing layer for learning to produce an extracted line-drawing layer and an extracted colorization layer; and storing a pair of the line-drawing image of the extracted line-drawing layer and the colorized image of the extracted colorization layer, as the learning data, in association with the identified element.

2. An image processing method according to claim 1, further comprising:

extracting the first line-drawing layer and the first colorization layer from the first image file based on information individually identifying a plurality of layers included in the first image file.

3. An image processing method according to claim 1, further comprising:

identifying the first element corresponding to the subject colorized image represented by the first image file based on a name of the first image file.

4. An image processing method according to claim 1, further comprising:

after modifying the first colorization layer of the subject image file based on the user input and upon accepting a predetermined user input, obtaining the subject image file comprising the modified colorization layer as the first image file for learning.

5. An image processing method according to claim 1, wherein the first element is a single element that is drawn in the subject colorized image represented by a single image file for learning.

6. An image processing method according to claim 1, wherein storing learning data comprises storing the pair of the line-drawing image and the colorized image for the plurality of elements into a data bucket using an append function.

7. An image processing method according to claim 1, further comprising:

extracting a second line-drawing layer and a second colorization layer from a second image file using a normalize function, wherein the normalize function changes a file format of the second line-drawing and the second colorization layer, and wherein the normalize function further adjusts an image size of the second line-drawing layer and the second colorization layer.

8. An image processing method according to claim 1, further comprising:

performing a per-color layer division on the subject colorized image to produce a plurality of colorization layers using a divide function, wherein the plurality of colorization layers comprises the generated colorization layer that corresponds to a single color.

9. An image processing method that is performed by a computer, the image processing method comprising:

storing learning data comprising a pair of a line-drawing image and a colorized image for a plurality of elements, wherein the plurality of elements are game characters within a computer game;

obtaining an image file for learning, wherein the image file is based on a data structure comprising a base-painting layer comprising a line-drawing layer and a colorization layer;

extracting the line-drawing layer and the colorization layer from the image file for learning to produce an extracted line-drawing layer and an extracted colorization layer;

identifying a first element corresponding to an image represented by the image file for learning as an identified element;

storing a pair of the line-drawing image of the extracted line-drawing layer and a colorized image of the extracted colorization layer, as the learning data, in association with the identified element;
generating an estimation model for estimating the colorized image from the line-drawing image for each element of the plurality of elements through machine learning using the learning data of the plurality of elements;
obtaining a subject line-drawing image, which is the line-drawing image of a subject that is to be colorized;
identifying a second element corresponding to the subject line-drawing image;
generating a subject colorized image using an infer function, wherein the subject colorized image is the colorized image that is to be paired with the subject line-drawing image, based on the estimation model corresponding to the second element corresponding to the subject line-drawing image and the subject line-drawing image, wherein the infer function automatically generates the subject colorized image using the subject line-drawing image as an input;
removing noise from the subject colorized image using a denoising function, wherein the denoising function performs a denoising filter on the subject colorized image;
generating a colorization layer of the image file by using the subject colorized image to produce a generated colorization layer;
inserting the generated colorization layer into a subject image file, which is the image file comprising the line-drawing layer corresponding to the subject line-drawing image;
modifying, based on a user input, the colorization layer of the subject image file in which the colorization layer has been inserted to produce a modified colorization layer; and
obtaining the subject image file comprising the modified colorization layer as the image file for learning.

10. An image processing system comprising:
a means for storing learning data comprising a pair of a line-drawing image and a colorized image for a plurality of elements, wherein the plurality of elements are game characters within a computer game;
a means for generating an estimation model for estimating the colorized image from the line-drawing image for the plurality of elements through machine learning using the learning data of the plurality of elements;
a means for obtaining a subject line-drawing image, which is the line-drawing image of a subject that is to be colorized;
a means for identifying a first element corresponding to the subject line-drawing image as an identified element;
a means for generating a subject colorized image using an infer function, wherein the subject colorized image is the colorized image that is to be paired with the subject line-drawing image, based on the estimation model corresponding to the identified element and the subject line-drawing image, wherein the infer function automatically generates the subject colorized image using the subject line-drawing image as an input;
means for removing noise from the subject colorized image using a denoising function, wherein the denoising function performs a denoising filter on the subject colorized image;
a means for generating a colorization layer of an image file using the subject colorized image to produce a generated colorization layer, wherein the image file is based on a data structure comprising a base-painting layer comprising a line-drawing layer and the colorization layer, wherein the line-drawing layer represents a line drawing drawn using only lines, and wherein the colorization layer does not include a line drawing and represents content of colorization for the line drawing;
a means for inserting the generated colorization layer into a subject image file, which is the image file comprising the line-drawing layer corresponding to the subject line-drawing image;
a means for modifying, based on a user input, the colorization layer of the subject image file in which the colorization layer has been inserted to produce a modified colorization layer;
a means for extracting the modified colorization layer and the line-drawing layer for learning to produce an extracted line-drawing layer and an extracted colorization layer; and
a means for storing a pair of the line-drawing image of the extracted line-drawing layer and the colorized image of the extracted colorization layer, as the learning data, in association with the identified element.

11. A non-transitory storage medium comprising a program configured to perform a method when executed by a computer, the program comprising:
a means for storing learning data comprising a pair of a line-drawing image and a colorized image for a plurality of elements, wherein the plurality of elements are game characters within a computer game;
a means for generating an estimation model for estimating the colorized image from the line-drawing image for the plurality of elements through machine learning using the learning data of the plurality of elements;
a means for obtaining a subject line-drawing image, which is the line-drawing image of a subject that is to be colorized;
a means for identifying a first element corresponding to the subject line-drawing image as an identified element;
a means for generating a subject colorized image using an infer function, which wherein the subject colorized image is the colorized image that is to be paired with the subject line-drawing image, based on the estimation model corresponding to the identified element and the subject line-drawing image, wherein the infer function automatically generates the subject colorized image using the subject line-drawing image as an input;
means for removing noise from the subject colorized image using a denoising function, wherein the denoising function performs a denoising filter on the subject colorized image;
a means for generating a colorization layer of an image file using the subject colorized image to produce a generated colorization layer, wherein the image file is based on a data structure comprising a base-painting layer comprising a line-drawing layer and the colorization layer, wherein the line-drawing layer represents a line drawing drawn using only lines, and wherein the colorization layer does not include a line drawing and represents content of colorization for the line drawing;
a means for inserting the generated colorization layer into a subject image file, which is the image file comprising the line-drawing layer corresponding to the subject line-drawing image;

a means for modifying, based on a user input, the colorization layer of the subject image file in which the colorization layer has been inserted to produce a modified colorization layer;

a means for extracting the modified colorization layer and the line-drawing layer for learning to produce an extracted line-drawing layer and an extracted colorization layer; and a means for storing a pair of the line-drawing image of the extracted line-drawing layer and the colorized image of the extracted colorization layer, as the learning data, in association with the identified element.

* * * * *